United States Patent [19]
Toki et al.

[11] Patent Number: 5,294,393
[45] Date of Patent: Mar. 15, 1994

[54] METHOD OF FORMING SHAPED BODY FROM FINE PARTICLES

[75] Inventors: Kazuyuki Toki; Mikio Murachi; Norio Taguchi, all of Susono, Japan

[73] Assignee: Toyota Jidosha Kabushiki Kaisha, Japan

[21] Appl. No.: 941,308

[22] Filed: Sep. 4, 1992

[30] Foreign Application Priority Data

Sep. 5, 1991 [JP] Japan .................... 3-254619

[51] Int. Cl.$^5$ ............................................. B29C 43/02
[52] U.S. Cl. ........................................ 264/121; 264/56; 264/63; 264/517
[58] Field of Search .................. 264/121, 56, 63, 517

[56] References Cited

U.S. PATENT DOCUMENTS 5,215,697  6/1993  Toki et al. ............................ 264/121

FOREIGN PATENT DOCUMENTS 0294596  12/1988  European Pat. Off. .

OTHER PUBLICATIONS

"Engineering Ceramics", special issue of Nikkei Mechanical, Nikkei–McGraw Hill Co., 1987, pp. 110–115, with English abstract.
European Search Report dated Dec. 14, 1992 (1 page).

*Primary Examiner*—Mary Lynn Theisen
*Attorney, Agent, or Firm*—Finnegan, Henderson, Farabow, Garrett & Dunner

[57] ABSTRACT

A shaped body is molded from fine particles such as powder, whiskers and short fibers, by preparing a slurry consisting of the fine particles and a supercritical fluid containing a small amount of binder dissolved therein, and supplying the slurry into a mold cavity through an inlet port, so that the fine particles suspended in the supercritical fluid are stacked in the cavity to form a layer as the supercritical fluid is exhausted out of the mold cavity through an outlet port.

8 Claims, 1 Drawing Sheet

METHOD OF FORMING SHAPED BODY FROM FINE PARTICLES

BACKGROUND OF THE INVENTION

1. Field of the Invention

The present invention relates to a method of forming a shaped body from fine particles such as powder, whiskers and short fibers, and more particularly, to a method of forming a shaped body from fine particles by employing a supercritical fluid and a binder which is soluble in the supercritical fluid.

2. Description of the Prior Art

As is described in, for example, an extra issue entitled "Engineering Ceramics" of a periodical named "Nikkei Mechanical" published by Nikkei-McGraw Hill Co. in 1987, it is conventionally known in the field of manufacture of ceramic or metal parts by the sintering to form a shaped body f rom a mixture of a powder material and a fluid binder (fluid in a narrow sense or fluidal material in a broad sense), wherein the mixture is injected into an injection mold or the like, and the molded body is treated by a degreasing process to remove the binder, whereby a shaped body of the powder material remains as a product.

However, in such a conventional powder molding method, since the binder must work as a means to hold the shape of a shaped body as well as a solvent to provide a powder material with a fluidity, a relatively large amount of binder is required due to the requirement for the generation of fluidity, whereby such problems are caused that the molded body has a defective portion like a weld line generated during the injection process, the molded body contracts too much during the degreasing process, and a void or an abnormally contracted portion is generated due to a local concentration of the binder.

Further, in the conventional powder molding method, the mixture of a powder material and a fluid binder must be thoroughly agitated to produce a uniform mixture prior to the injection thereof into the mold. However, it requires a long time to mix fine particles with a fluid binder, generally having a high viscosity, into a uniform mixture.

Still further, in order to remove a large amount of binder from the molded body, the degreasing process, which is a process of heating the molded body at a controlled temperature, requires a long time such as tens of hours or several days, and if such a long time degreasing process is not properly carried out, a cracking, a contraction, or other failure is ready to occur.

SUMMARY OF THE INVENTION

In view of the above-mentioned problems of the conventional powder molding method, it is the object of the present invention to provide an improved method of molding fine particles, in which the process of removing the binder from the molded body is obviated, so that a shaped body is manufactured to have a uniform quality at high efficiency and low cost, by employing a supercritical fluid which contains a small amount of a binder as dissolved therein.

According to the present invention, the above-mentioned object is accomplished by a method of forming a shaped body from fine particles, comprising the steps of providing a mold having a mold cavity to form the shaped body and inlet and outlet passages communicating to said cavity, preparing a slurry consisting of fine particles and a supercritical fluid containing a binder dissolved therein, and supplying the slurry into said cavity through said inlet passage, while discharging the supercritical fluid through said outlet passage.

When a slurry consisting of fine particles and a supercritical fluid containing a binder dissolved therein is supplied into a mold cavity though an inlet passage, while the supercritical fluid is discharged from the mold cavity through an outlet passage, a steep but stepless pressure gradient is generated in the mold cavity, so that the pressure in the mold cavity lowers from a pressure supercritical for the fluid in a region adjacent the inlet passage down to a pressure close to the atmospheric pressure in a region adjacent the outlet passage. Under such a steep pressure gradient, the fine particles are stacked up to form a packed layer, starting from a location in the mold cavity adjacent the outlet passage, across the mold cavity, toward a location thereof adjacent the inlet passage. At the same time, due to a decrease of the solubility of the binder in the fluid corresponding to the decrease of the pressure of the fluid, the binder gradually precipitates from the fluid, so as to be deposited on each fine particle and thereby to bind the fine particles with one another. Since these processes proceed at high speed, a shaped body of fine particles having a uniform quality and a high solidity with a low binder content is formed at a high efficiency and a low cost.

Any material may be used as the supercritical fluid in the method of the present invention, provided that the fluid has no disadvantageous effect on the particle material and is brought into a supercritical state under a desirable temperature and a desirable pressure. $CO_2$, air and $N_2$ may be advantageously used as the supercritical fluid from the view points of price, safety and easiness of handling. For the easiness of handling, it is desirable that the fluid is in the gaseous state at the atmospheric temperature and pressure.

When the supercritical fluid is in the gaseous state at the atmospheric temperature and pressure, the supercritical fluid, which worked as a solvent medium to provide the fine particles with a fluidity, rapidly lowers its pressure in the mold cavity by an adiabatic expansion, changing into a gas, so that it may be directly exhausted to the atmosphere. Therefore, the removal of the fluid from a shaped body of fine particles is carried out at high efficiency at the same time as the shaped body is formed from fine particles, whereby the overall efficiency of the production of a shaped body from fine particles is even more improved.

Any material may be used as the binder in the method of molding fine particles according to the present invention, provided that it is soluble in the supercritical fluid, precipitates from the fluid along with decrease of the pressure of the fluid, and binds fine particles with one another when it solidifies. The binder material should more desirably be such that it is readily expelled out of the shaped body by vaporization when the shaped body is sintered. Low molecular organic binders such as paraffin wax, stearyl alcohol, cetylacetic acid, etc. are suitable for such purposes. A liquid such as water works as an auxiliary binder by its function of binding fine particles with one another under the surface tension, thereby improving the solidity of the molded body. Therefore, the binder in the present invention may include such a liquid.

The slurry of fine particles and a supercritical fluid containing a binder dissolved therein may be produced by mixing the fine particles, the binder and the supercritical fluid, as three starting materials. However, since the solubility of a binder into a supercritical fluid is limited, it is desirable that a first slurry is prepared by mixing fine particles with a supercritical fluid, while a second slurry is separately prepared by dissolving a binder into a supercritical fluid, and then the first and second slurries are mixed with one another. Otherwise, it may happen that an excessive binder in the solid state remains in a supercritical fluid and causes a local concentration of the binder in the molded body.

BRIEF DESCRIPTION OF THE DRAWING

In the accompanying drawing.

DESCRIPTION OF THE PREFERRED EMBODIMENT

In the following, the present invention will be described in more detail with respect to some preferred embodiments thereof with reference to the accompanying drawing.

Figure 1:
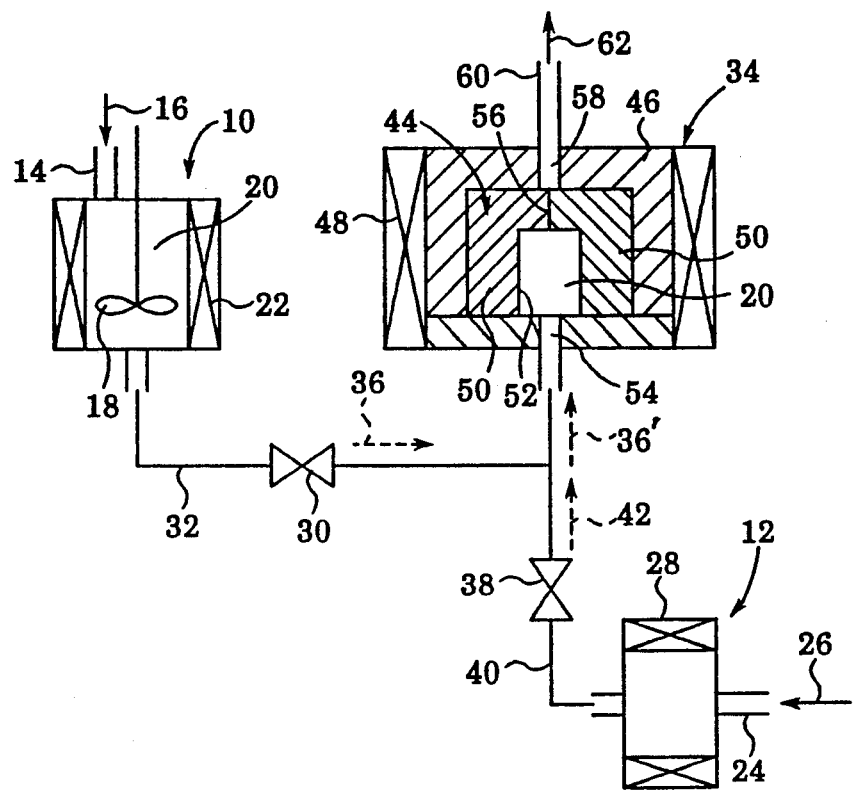
FIG. 1 is a diagrammatical illustration showing an embodiment of the molding device to carry out the method of the present invention.

Referring to FIG. 1, 10 designates a fine particle agitation vessel, and 12 designates a binder mixing vessel. A conduit 14 is connected to the agitation vessel 10 to selectively supply a supercritical fluid 16 therein. An agitator 18 is provided in the agitation vessel 10 to mix by agitation fine particles of powder 20 supplied therein through a supply port (not shown in the figure) with the supercritical fluid 16 supplied therein through the conduit 14, thereby producing a slurry consisting of the fine particles and the supercritical fluid mixed into a uniform mixture. A heater 22 is provided around the agitation vessel 10 to maintain the inside of the vessel at a predetermined temperature.

The binder mixing vessel 12 is charged with a binder through a port (not shown in the figure), and is supplied with a supercritical fluid 26 through a conduit 24. The supercritical fluid 26 may be or may not be the same as the supercritical fluid 16. As the supercritical fluid 26 is conducted through the binder mixing vessel 12, the binder is dissolved into the supercritical fluid, thereby generating a supercritical fluid containing a binder. A heater 28 is provided around the binder mixing vessel 12.

The fine particle agitation vessel 10 is connected with a molding device 34 by a conduit 32 including a shutoff valve 30, so that a slurry 36 generated in the agitation vessel and consisting of the fine particles and the supercritical fluid is selectively supplied to the molding device 34. Similarly, the binder mixing vessel 12 is connected with the molding device 34 by a conduit 40 including a shutoff valve 38, so that the supercritical fluid 42 generated in the mixing vessel 12 and containing the binder dissolved therein is selectively supplied to the molding device 34. Heaters are provided around the conduits 32 and 40 to maintain the inside of these conduits at respective predetermined temperatures, although such heaters not shown in the figure.

The molding device 34 comprises a mold 44 and a housing 46 receiving the mold therein. A heater 48 is provided to maintain the inside of the mold at a predetermined temperature. In the shown embodiment, the mold 44 is made of four sector members 50 assembled together to meet at respective vertical faces extending along two vertical planes which cross one another.

The sector members 50 received in the housing 46 define, in combination, a mold cavity 52 and a slurry inlet port 54, and also a minute space between each two mating faces of the sector members which operates as a gas outlet port 56. A passage 58 is formed in the housing 46 to be in communication with the gas outlet port 56 and is connected with a conduit 60, so that a gas 62 is exhausted from the mold cavity 52 through the gas outlet port 56, the passage 58 and the conduit 60.

Embodiment 1

A shaped body substantially made of silicon nitride powder was produced by the molding device described above.

With the shutoff valve 30 being closed, a raw powder material 20 consisting of 960 g silicon nitride powder (0.4 micron mean diameter), 20 g yttrium oxide powder (0.2 micron mean diameter) and 20 g alumina powder (0.1 micron mean diameter) was charged into the agitation vessel 10, and then a supercritical fluid 16 consisting of $CO_2$ in a supercritical state of 60° C. and 200 $kgf/cm^2$ was supplied into the agitation vessel 10. Then, maintaining the supercritical condition of $CO_2$ in the vessel, the agitator 18 was operated for 3 hours, thereby producing a slurry 36 consisting of the raw powder material and $CO_2$ in the supercritical state.

On the other hand, with the shutoff valve 38 being closed, paraffin wax as a binder was charged into the binder mixing vessel 12, and then a supercritical fluid 26 consisting of $CO_2$ in a supercritical state of 60° C. and 200 $kgf/cm^2$ was supplied into the mixing vessel 12, thereby producing a supercritical $CO_2$ 42 containing the paraffin wax dissolved therein.

Then, opening the shutoff valves 30 and 38 at the same time, and mixing the slurry 36 conducted through the conduit 32 mixed with the supercritical $CO_2$ 42 containing paraffin wax conducted through the conduit 40, the generated resultant slurry 36' containing the raw powder material and the supercritical $CO_2$ containing paraffin wax dissolved therein, was charged into the mold cavity 52 of the mold 44 through the inlet port 54.

Although it was not visually observed, since the conduit 60 was opened to the atmosphere it was surmised that the supercritical $CO_2$ charged into the mold cavity 52 had changed into a normal gas state before it was exhausted through the gas outlet port 56, the passage 58 and the conduit 60 to the atmosphere. In the mold cavity 52, it was surmised that the powder material suspended in the supercritical $CO_2$ was first caught on an inside wall portion of the mold cavity adjacent the outlet port 56 so as to form a layer of the powder material, and then the layer gradually grew up while being compressed by an increasing pressure gradient to have a higher density until it finally reached the inlet port 54. It was also surmised that, in the meantime, the supercritical fluid gradually lost its pressure as it passed through the layer of the powder material, with a gradual precipitation of the binder due to a corresponding decrease of the solubility thereof in the fluid depending upon the pressure thereof, and the binder thus precipitated deposited on the surface of each particle of the powder material, thereby binding the particles together.

Figure 2:
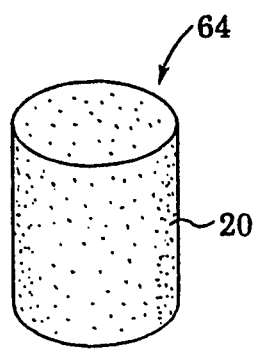
FIG. 2 is a perspective view of a shaped body molded by the molding device shown in FIG. 1 according to the method of the present invention.

After the completion of the molding process, the mold 44 was removed from the housing 46 and disassembled, to release a shaped body 64 molded in the mold cavity 52, as shown in FIG. 2. It was confirmed that the shaped body had a high solidity to allow for easy handling. The dimensions and the configuration of the shaped body were very close to those of the mold cavity, with no observable contraction or cracking.

Embodiment 2

A shaped body was produced in the same manner and under the same temperature and pressure conditions as in Embodiment 1, except that, in the agitation vessel 10, in addition to a raw powder material consisting of 960 g silicon nitride powder (0.4 micron mean diameter), 20 g yttrium oxide powder (0.2 micron mean diameter) and 20 g alumina powder (0.1 micron mean diameter), 50 g water was also charged into the agitation vessel 10, so that the raw powder material, the supercritical $CO_2$ and water were mixed by agitation. The slurry thus prepared in the agitation vessel 10 was mixed with a supercritical $CO_2$ processed in the binder mixing vessel 12 to contain paraffin wax to as a binder, and was charged into the mold cavity 52 of the molding device 34, in the same manner as in Example 1, to produce a shaped body.

The shaped body thus obtained showed dimensions and a configuration very close to those of the mold cavity 52, with no observable contraction or cracking, and was superior to the product of Embodiment 1 in the easiness of handling. It was considered that the further improvement in the solidness of the shaped body was obtained by an auxiliary binding action of the water contained in the slurry.

With no degreasing treatment, the shaped bodies obtained in Embodiments 1 and 2 were sintered at 1750° C. for 4 hours. They were sintered in a good condition, with no observable contraction or cracking. Thus, it was confirmed that no degreasing treatment is required. The sintered bodies were cut for observation of an inner construction. It was confirmed that the entire section showed a uniform construction with no void or defective portion.

Although a powder has been used in the above-described embodiments 1 and 2, whiskers or short fibers may also be used in the same manner to form a shaped body.

The conduits 32 and 40 may be equipped with non return valves which allow the slurry or the fluid to flow only from the agitation vessel 10 or the binder mixing vessel 12 toward the molding device 34 so that no reverse flows would occur. The conduit 40 may be equipped with a filter to catch a solid binder when it flows out of the binder mixing vessel due to an excessive supply thereof in the vessel, so that no such solid binder is allowed to enter into the molding device.

When the binder is supplied in the form of a solid lump, it may be positioned in the binder mixing vessel as housed in a cage, so that it is dissolved out into the supercritical fluid as it flows around the cage in the vessel. This method will guarantee that the binder is dissolved into the supercritical fluid as much as it is soluble, and no binder in the solid state is carried away by the supercritical fluid.

As will be appreciated from the foregoing descriptions, according to the present invention, an easy and simple process that a slurry prepared from fine particles and a supercritical fluid containing a binder dissolved therein is supplied into a mold cavity through an inlet port, a shaped body having a uniform internal construction and a low binder content and requiring no degreasing treatment is obtained with an automatic removal of the supercritical fluid from the molded body through a gas outlet port of the mold cavity in a subcritical state. Therefore, shaped bodies having high purity and density are produced at high efficiency and low cost.

Since a supercritical fluid having very low viscosity and surface tension as compared with normal fluid such as liquid is used as a solvent medium for fine particles, and since the binder is needed only at a very small content enough to bind the fine particles with one another, the binder is mixed much more uniformly with the fine particles as compared with the conventional method in which the binder also works as a solvent medium for the fine particles, and therefore a more uniform construction of the shaped body is obtained at higher efficiency and lower cost.

Since a supercritical fluid working as a solvent medium for fine particles changes into a gas and is exhausted out of a molded body as it is formed, and since a small amount of binder remains in the molded body, there occurs no such contraction or cracking due to a phase conversion of a large amount of solvent between the solid state and the liquid state as in the conventional method, and therefore, the present invention allows for productions of a large variety of shaped bodies with less restrictions about thickness, configuration, etc.

Since a slurry by a solvent medium consisting of a supercritical fluid has a low viscosity as compared with a slurry by a solvent medium consisting of a liquid, the slurry inlet port of the mold cavity may be correspondingly small, and therefore, the mold cavity may have a configuration more faithful to that required for an article to be produced.

Although the present invention has been described above with respect to some particular embodiments thereof, it will be apparent for those skilled in the art that various modifications are possible within the scope of the present invention.

We claim:

1. A method of forming a shaped body from fine particles, comprising the steps of providing a mold having a mold cavity to form the shaped body and inlet and outlet passages communicating with said cavity, preparing a slurry consisting of fine particles and a fluid maintained in the supercritical state and containing a binder dissolved therein, introducing said slurry into said cavity through said inlet passage, depositing said particles in said cavity while precipitating said binder on the surfaces of said particles, and discharging said fluid in its normal gas state from said outlet passage.

2. A method according to claim 1, wherein said fluid is one selected from $CO_2$, air and $N_2$.

3. A method according to claim 1, wherein said binder is selected from low molecular organic binders including paraffin wax, stearyl alcohol and cetylacetic acid. A 4. A method according to claim 1, wherein water is added to said slurry as an auxiliary binder.

5. A method according to claim 1, wherein the fine particles are a mixture of a silicon nitride powder, an yttrium oxide powder and an alumina powder, the fluid is $CO_2$, and the binder is paraffin wax.

6. A method according to claim 1, wherein said slurry is produced by preparing a slurry by mixing the fine particles with a supercritical fluid, separately dissolving a binder into a supercritical fluid, and then mixing said slurry and the binder-supercritical fluid solution with one another.

7. A method according to claim 6, wherein said slurry is prepared by mixing a mixture of a silicon nitride powder, an yttrium oxide powder and an alumina powder with $CO_2$ in a supercritical state, and said solution is prepared by dissolving paraffin wax into $CO_2$ in a supercritical state.

8. A method according to claim 1, wherein said slurry is produced by preparing a mixture of a silicon nitride powder, an yttrium oxide powder and an alumina powder and water with $CO_2$ in a supercritical state, while a solution is separately prepared by dissolving paraffin wax into $CO_2$ in a supercritical state, and then the slurry and the solution are mixed with one another.

* * * * *

UNITED STATES PATENT AND TRADEMARK OFFICE
CERTIFICATE OF CORRECTION

PATENT NO. : 5,294,393
DATED : March 15, 1994
INVENTOR(S) : Toki et al.

It is certified that error appears in the above-indentified patent and that said Letters Patent is hereby corrected as shown below:

Claim 3, Col. 6, line 56, delete "A".

Signed and Sealed this

Eleventh Day of October, 1994

Attest:

BRUCE LEHMAN

*Attesting Officer*     *Commissioner of Patents and Trademarks*